United States Patent Office 3,178,364
Patented Apr. 13, 1965

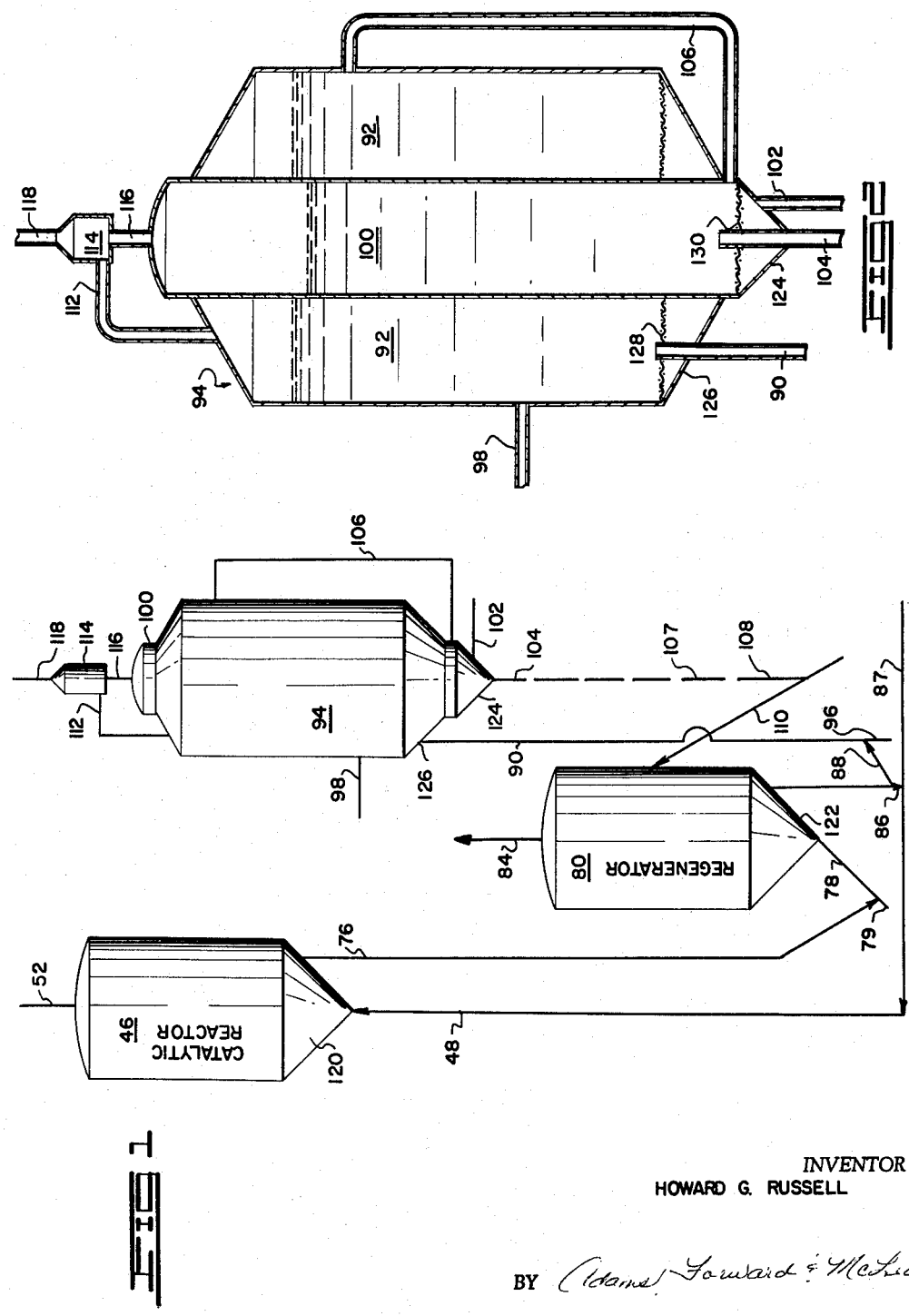

3,178,364
CATALYST DEMETALLIZATION EFFLUENT TREATMENT
Howard G. Russell, Munster, Ind., assignor, by mesne assignments, to Sinclair Research Inc., New York, N.Y., a corporation of Delaware
Filed Dec. 16, 1960, Ser. No. 76,163
7 Claims. (Cl. 208—120)

This invention is a method for treating certain waste products of a catalyst demetallization procedure and a demetallization treatment which provides additional manipulative advantages.

The need has been expressed in the art for a feasible process for the catalytic conversion of certain petroleum or similar hydrocarbon feeds. The chief deterrent to catalytic conversion of certain hydrocarbon feeds by conventional means has been the severe catalyst contamination, due to contaminant metals in many feeds, which leads to poor catalyst activity and often to poor product distribution and otherwise reduces the desired effectiveness of the catalyst. A number of procedures, however, have recently been discovered by which a hydrocarbon conversion catalyst may be demetallized, that is, reduced in its content of iron, nickel or vanadium contaminants deposited on the catalyst during the conversion. According to these procedures, the demetallization of the catalyst will generally include one or more processing steps wherein the catalyst is contacted, usually at an elevated temperature with a vapor reactive with the metal poison on the catalyst. Copending patent applications Serial Nos. 763,834, filed September 29, 1958, now abandoned; 842,618, filed September 28, 1959, now abandoned; Serial No. 53,380, filed September 1, 1960, now Patent No. 3,122,497; Serial No. 53,623, filed September 2, 1960; Serial No. 54,532, filed September 7, 1960, now abandoned; Serial No. 54,405, filed September 7, 1960, now U.S. Patent No. 3,122,510; Serial No. 54,368, filed September 7, 1960, now Patent No. 3,122,512; Serial No. 55,129, filed September 12, 1960; Serial No. 55,160, filed September 12, 1960; and Serial No. 55,703, filed September 13, 1960; all of which are hereby incorporated by reference, describe procedures by which such demetallization may be accomplished. In particular it has been found that sulfidation of a nickel-poisoned catalyst appears to have important effects in making more nickel available for later removal by other procedures so that sulfidation, as described in application Serial No. 53,380, filed September 1, 1960 may frequently be performed when nickel removal is desired. Also, as pointed out in copending applications Serial No. 19,313, filed April 1, 1960, now abandoned and Serial No. 55,160, filed September 12, 1960, a preliminary treatment of the catalyst with molecular oxygen-containing gas is of value in improving the vanadium removed by subsequent procedures.

It has been found however, that sulfidation may lead to a number of difficulties in catalyst handling and temperature control. For example, sulfidation is performed at an elevated temperature by contacting the poisoned catalyst with elemental sulfur vapors, or more conveniently by contacting the poisoned catalyst with a volatile sulfide, such as $H_2S$, $CS_2$ or a mercaptan. The contact with the sulfur-containing vapor can be performed generally in the range of about 500 to 1500° F., preferably about 800 to 1300° F. Other treating conditions can include a sulfur-containing vapor partial pressure of about 0.1 to 30 atmospheres or more, preferably about 0.5 to 25 atmospheres. Hydrogen sulfide is the preferred sulfiding agent because of economic and chemical factors, but it produces an effluent vapor which contains free sulfur as well as excess $H_2S$. The free sulfur has a tendency to condense and plug the effluent lines. Temperatures of about 900 to 1200° F. and pressures approximating 1 atmosphere or less seem near optimum for sulfiding and this treatment often continues for at least 1 or 2 hours but the time, of course, can depend upon the temperature as well as the manner of contacting the catalyst and sulfiding agent and the nature of the treating system, e.g. batch or continuous, as well as the rate of diffusion within the catalyst matrix. In general it has been found that sulfiding proceeds quicker at higher temperatures.

Treatment of regenerated catalyst with molecular oxygen containing gas before sulfiding has been found useful in increasing vanadium removal as described in copending applications Serial Nos. 19,313, filed April 1, 1960, and 55,160, filed September 12, 1960. The temperature of this treatment is generally in the range of about 1000 to 1800° F. but below a temperature where the catalyst undergoes any substantial deleterious change in its physical or chemical characteristics. The treatment of the vanadium-poisoned catalyst with molecular oxygen-containing gas is preferably performed at a temperature of about 1150 to 1350, and although a temperature of about 1600° F. may sometimes be used, such high temperatures may lead to catalyst damage such as sintering in many instances. It is desirable where both preliminary treatment with molecular oxygen-containing gas and sulfiding are to be performed on a poisoned catalyst to employ the preliminary treatment to supply to the catalyst the heat necessary to maintain the sulfiding temperature. To do so the temperature of the preliminary treatment must ordinarily be about 100–150° F. higher than in the sulfider because of radiation losses from the sulfider. In this invention, the preliminary treatment is performed in a zone which surrounds the sulfiding zone, thus eliminating the manipulative need for this temperature differential. Thus, a sulfiding procedure may be performed on the catalyst at a temperature of about 1300° F. without exceeding the preferred upper temperature limit of 1350° F. for the oxygen treatment. In this invention oxygen treatment and sulfidation may be performed at substantially the same temperature, within the effective ranges. Also, this invention provides for burning sulfur in the effluent vapors from sulfiding before the sulfur can condense and plug the lines with solids.

In the preliminary treatment the oxygen-containing gas used contains molecular oxygen as the essential active ingredient. The gas may be oxygen, or a mixture of oxygen with inert gas, such as air or oxygen-enriched air. Little oxygen is consumed in the treatment and the effluent gas is combined with the sulfider effluent causing burning of the sulfider effluent.

The invention will be better understood by reference to the accompanying drawing in which:

FIGURE 1 is an elevational view of apparatus for conducting a catalytic reaction, regenerating the catalyst and treating the catalyst with molecular oxygen-containing gas and sulfiding the catalyst; and FIGURE 2 is an enlarged vertical section of the oxygen-treating and sulfiding apparatus.

FIGURE 1 shows a catalytic reactor 46 which is provided with a feed line 48 for introduction of catalyst and a hydrocarbon feedstock. The reactor is also provided with the exit line 52 for removal of product hydrocarbons which are generally in a vapor state and with the standpipe 76 for the removal of catalyst which is of need of regeneration. This catalyst is conveyed from standpipe 76 through pipe 78 conveniently by air from the source 79 to the regenerator 80. In the regenerator this air or additionally introduced air burns coke from the catalyst. The regenerator is also provided with the vent 84 for removal of exhaust gases. Regenerator standpipe 86 is provided for removal of regenerated catalyst from the combustion zone maintained in the regenerator. This catalyst may be conveyed by feed hydrocarbon from the source 87 through the pipe 48 to the reactor.

The regenerator standpipe 86 is provided also with the tapline 88 whereby a selected amount of catalyst may be conveyed through pipe 90 to the outer annular chamber 92 of vessel 94. A source 96, of air, or other molecular oxygen-containing gas, is also provided, conveniently at the lower end of pipe 90 whence the gas may be used to convey catalyst to the chamber 92. Chamber 92 is also provided with the line 98 for liquid or gaseous fuel injection.

As shown, the chamber 92 is formed annularly around chamber 100 which is provided for sulfiding of the catalyst. This chamber is provided with line 102 for the entry of sulfiding gas, with pipe 104 for catalyst removal and with line 106 for catalyst introduction.

Catalyst and air entering chamber 92 from pipe 90 are contacted with fuel from the pipe 98 which burns, giving the desired elevated temperature to the bed of catalyst in chamber 92. Continual entry of catalyst causes passage of catalyst particles into the pipe 106 whence catalyst passes into the inner chamber 100. In the inner chamber the catalyst at the elevated temperature maintained by fuel burning in the outer chamber, is contacted with sulfiding gas from the line 102 and eventually passed out of the bed illustrated through the pipe 104. The catalyst then passes through other phases of the demetallization procedure, as described below and illustrated in the drawing by the dashed line 107 and finally passes to the line 108 whence it is conveyed back to the hydrocarbon conversion system preferably by the line 110 to the catalyst regenerator.

Waste effluent gas from the outer chamber 92, containing flue gas and a good deal of free oxygen leaves by line 112 to the burner 114. Effluent from the sulfiding chamber 100 containing free sulfur vapors and also, for example, $H_2S$, exits by line 116 to the burner 114. Exhaust gas leaves the burner by line 118.

The apparatus shown is suitable for contact of the catalyst with the gases in fluidized beds. The vessels are provided with sloping bottoms 120, 122, 124 and 126 and with grids 128 and 130.

Solid oxide catalysts, both naturally occuring activated clays and synthetically prepared gel catalysts, as well as mixtures of the two types, have long been recognized as useful in catalytically promoting conversion of hydrocarbons. A popular "natural" catalyst is "Filtrol" which is acid-activated montmorillonite. For cracking processes, the solid oxide catalysts which have received the widest acceptance today are usually activated or calcined predominantly silica or silica-based, e.g. silica-alumina, silica-magnesia, silica-zirconia, etc., compositions in a state of slight hydration and containing small amounts of acidic oxide promoters in many instances. The oxide catalyst may be alumina- or silica-based and ordinarily contains a substantial amount of a gel or gelatinous precipitate comprising a major portion of silica and at least one other material, such as alumina, zirconia, etc. The use of wholly or partially synthetic gel catalysts, which are more uniform and less damaged by high temperatures in treatment and regeneration, is often preferable. Popular synthetic gel cracking catalysts generally contain about 10 to 30% alumina. Two such catalysts are "Aerocat" which contains about 13% $Al_2O_3$, and "High Alumina Nalcat" which contains about 25% $Al_2O_3$, with substantially the balance being silica. The catalyst may be made only partially of synthetic material; for example it may be made by the precipitation of silica-alumina on clay, such as kaolinite or halloysite. One such semi-synthetic catalyst contains about equal amounts of silica-alumina gel and clay.

The physical form of the catalyst varies with the type of manipulative process to which it will be exposed. In fluid catalytic processes gases are used to convey the catalyst in the form of a fine powder, generally in a size range of about 20 to 150 microns. In the "TCC" or "Thermofor" process the catalyst is in the form of beads which are conveyed by elevators. Generally these beads may range in size up to about ½" in diameter. When fresh, the minimum sized bead is generally about ⅛". Other types of process use other forms of catalyst such as tablets or extruded pellets. The cracking process of this invention preferably uses the fluidized solids technique.

In this invention the hydrocarbon petroleum oils utilized as feedstock for a conversion process may be of any desired type normally utilized in catalytic conversion operations. This feedstock contains nickel and/or vanadium, sometimes as much as 0.003%, and the catalyst may be used as a fixed, moving or fluidized bed or may be in a more dispersed state. For typical operations, the catalytic cracking of the hydrocarbon feed would normally result in a conversion of about 50 to 60% of the feedstock into a product boiling in the gasoline boiling range. In cracking, diluents for the feed may be employed. Such diluents include steam, other inert gases, and low end-point hydrocarbon vapors and may be as much as about 150 weight percent of the petroleum feed and when used are usually at least about 10 percent.

Preferably, coke yield is held to a minimum through the use of good steam stripping and a high steam partial pressure in the reactor and the catalyst surface is kept reasonably free of metal poisons by demetallization. Ordinarily, the catalysts are treated before the poisoning metals have reached an undesirably high level, for instance, about 1%, generally no more than about 0.5% maximum, content of vanadium, nickel and/or iron.

The catalyst may be removed from the cracker—that is, the stream of catalyst which is cycled between conversion and regenerating operations—before the poison content reaches about 5000 to 10,000 p.p.m., the poisoning metals being calculated as their common oxides. Generally, at least about 250 or 500 p.p.m. vanadium and/or at least about 100 or 200 p.p.m. nickel will be accumulated on the catalyst before demetallization is warranted. A suitable amount, generally a small portion of the catalyst, is removed from the cracker and demetallized, preferably after the oxidation regeneration which serves to remove carbonaceous deposits. With a continuously circulating catalyst stream, such as in the ordinary "fluid" system a slip-stream of catalyst may conveniently be removed intermittently or continuously from the regenerator standpipe. The severity of regeneration is generally such that the catalyst sent to demetallization contains not more than about 0.5% carbon. Where the catalyst is sent to a demetallization which includes a high temperature treatment with molecular oxygen-containing gas before the catalyst is substantially carbon free, the length of oxygen treatment is reckoned from the time that the catalyst reaches the substantially carbon free state, that is the state where little, if any, carbon is burned or oxygen consumed even when the catalyst is contacted with oxygen at temperatures conducive to combustion.

In the practice of this invention demetallization may be accomplished by the intermittent or continuous withdrawal of contaminated catalyst from the cracking system, for example, from the regenerator standpipe. The catalyst is subjected to high temperature treatment with molecular oxygen-containing gas and to sulfiding. Then the catalyst is sent to other metals removal procedures as described in the copending patent applications enumerated above. The catalyst, substantially reduced in contaminating metal content is returned to the cracking system. In the treatment to take poisoning metals from the cracking catalyst a large or small amount of metal can be removed as desired. The amount of poisoning metal that is removed from the catalyst depends on the amount of poison which can be tolerated, for example, where a cracking unit can tolerate 100 p.p.m. Ni and the demetallization process removes 50% of the metals, only 50 p.p.m. Ni is removed in each demetallization, but where a unit can tolerate 500 p.p.m., 250 p.p.m. may be removed each time the poisoned catalyst is sent through the demetallization unit. The tolerance of the unit for poison is determined, for example, by the loss in yield due to poisoning compared to the cost of enlarged demetallization facilities. When treating the catalyst it is preferred to remove at least about 10% up to about 70% or more of one or more of the metals in question. The demetallization rate may be about 20–200% of catalyst inventory daily, that is, within a 24-hour period, more than about ⅕ of the amount of catalyst in the system is subjected to the demetallization and sometimes, when it is necessary, twice the amount of catalyst in the system is subjected to one or more of the demetallization procedures.

The hydrocarbon products from the cracking zone are usually conducted to a fractionator, with or without intermediate cooling. In the fractionation, which may be conducted under partial vacuum, the lower boiling gasoline constituents of the cracker effluent having an approximate 375°–430° F. end point are vaporized and removed from the system and may be used as gasoline blending components or other products. Heavier portions of the cracker effluent may be recycled to the cracking zone or withdrawn from the system for further treatment or use.

Regeneration of a catalyst to remove carbon is a relatively quick procedure in most commercial catalytic conversion operations. For example, in a typical fluidized cracking unit, a portion of catalyst is continually being removed from the reactor and sent to the regenerator for contact with air at about 950 to 1200° F., more usually about 1000 to 1150° F. Combustion of coke from the catalyst is rapid, and for reasons of economy only enough air is used to supply the needed oxygen. Average residence time for a portion of catalyst in the regenerator may be on the order of about six minutes and the oxygen content of the effluent gases from the regenerator is desirably less than about 5%, preferably less than about 2%.

As mentioned, a minor portion of the catalyst is continuously removed as a side stream from the regenerator associated with the cracker and is sent to a treatment in the annular chamber with molecular oxygen-containing gas. During this high-temperature treatment there is substantially no oxygen consumption. The residence time of the catalyst in this bed is regulated so that contact of catalyst and vapor is at least long enough to convert a substantial amount of vanadium to a higher valence state, as evidenced by a significant increase, say at least about 10%, preferably at least about 100%, in the vanadium removal in subsequent stages of the process. This increase is over and above that which would have been obtained by the other metals removal steps without the oxygen treatment. The partial pressure of oxygen in the treating gas may range widely, for example, from about 0.1 to 30 atmospheres, but usually the total gas pressure will not exceed about 25 atmospheres. The factors of time, partial pressure and extent of vanadium conversion may be chosen with a view to the most economically feasible set of conditions. It is preferred to continue the oxygen treatment for at least about 15 or 30 minutes with a gas containing at least about 1%, preferably at least about 10% oxygen. The catalyst passes directly from the oxygen treatment to sulfiding in the interior chamber of the apparatus.

The sulfiding step performs the function not only of forming a sulfur-containing metal compound which may be easily converted to the sulfate or other dispersible form but also apparently serves to concentrate some metal poisons, especially nickel, at the surface of the catalyst particle. In sulfiding pressures below atmospheric can be obtained either by using a partial vacuum or by diluting the vapor with gas such as nitrogen or hydrogen. The time of contact may vary on the basis of the temperature and pressure chosen and other factors such as the amount of metal to be removed. The sulfiding may run for, say, up to about 20 hours or more depending on these conditions and the severity of the poisoning.

After the sulfiding one or more treatments are given the catalyst to remove the metal contaminants. It has been found, for example, that Ni, Fe and V may be removed from a catalyst by converting the metals into volatile compounds; a chlorination treatment can convert iron and vanadium to volatile chlorides, and nickel may be converted to the volatile nickel carbonyl by hydrogenation and treatment with carbon monoxide. It has also been found that Ni, Fe and V may be removed from a catalyst by certain aqueous media; a basic aqueous wash containing ammonium ions is suitable for removal of V poisons; the removal of nickel may be accomplished by the use of a slightly acid aqueous wash when the nickel is first converted into a compound dispersible in such a wash. The chlorination treatment can convert nickel to the soluble chloride form. Also, a poisoned catalyst may be reduced in nickel content by the aqueous wash when nickel contaminants are put into the sulfate or other dispersible form by oxidizing the sulfided catalyst. Such an oxidation may be performed by an oxidizing vapor or by an aqueous oxidizing agent. The demetallization treatment may remove a substantial part of one or more of these metals, preferably all three, or at least nickel and vanadium. The withdrawal of catalyst from the cracking system can be on a continuous or intermittent basis and ordinarily the catalyst will not be allowed to accumulate more than about 5000 or 7500 p.p.m. of poisoning metal. Subjecting the poisoned catalyst sample to magnetic flux may be found desirable to remove any tramp iron particles which may have become mixed with the catalyst.

The present invention will be further described with reference to the following examples which are not to be considered limiting.

*Example 1*

A 40% reduced North Texas petroleum crude having an API gravity of about 22, a Conradson carbon of about 5 weight percent, a viscosity of about 100 seconds Saybolt Universal at 210° F., and an initial boiling point above about 650° F. at atmospheric pressure, containing 25.0 p.p.m. of nickel, 60 p.p.m. of vanadium and 19.6 p.p.m. of iron is preheated to about 600 to 700° F., and introduced into a first stage cracker, mixed with a finely divided cracking catalyst and about 100 lbs. steam/bbl. residual feed for dispersion and stripping. The catalyst introduced into the feed line is a "Nalcat" synthetic gel cracking catalyst containing 25% $Al_2O_3$, the balance silica, and having fluidizable particle size and a relativley low level of activity.

Cracking conditions in the cracker are low enough to keep conversion of the feedstock to a 430° F. end point gasoline at a 36–42% yield, but sufficiently high to enable the contaminated feedstock to deposit substantially all of its meal content on the catalyst. The temperature of the cracking zone is kept at about 850° F. under a pressure of about 10 p.s.i.g. The feedstock mixture is conveyed through the cracker at a weight hourly space velocity of about 15. A portion of catalyst is continually sent to a regenerator where it is contacted with air at 1050° F. to burn off the carbon. A side stream of regenerated catalyst having a carbon content of about 0.4%, 375 p.p.m. nickel, 1950 p.p.m. vanadium and 770 p.p.m. iron is continuously removed from the regenerator at an inventory rate of 75% daily and sent to the oxygen-treating and sulfiding unit.

The catalyst is first sent to the annular chamber at a rate sufficient to give the catalyst an average treating time of about one hour in contact with air at about 1200° F.

This temperature is provided by injecting distillate fuel oil into the catalyst bed. Sufficient air is supplied to the bed that the gases coming in contact with the catalyst after combustion contain more than about 10% oxygen. The catalyst passes into the inner chamber where it is fluidized with $H_2S$ gas at the prevailing temperature of about 1200° F. for an average residence time of about an hour. The effluent gases from both the oxygen treatment and the sulfiding treatment are sent to a burner which gives off an effluent consisting essentially of fully oxidized products.

The catalyst is then purged with flue gas at a temperature of about 575° F. and chlorinated in a chlorination zone with an equimolar mixture of $Cl_2$ and $CCl_4$ at about 600° F. After about 1 hour no trace of iron or vanadium chloride can be found in the chlorination effluent and the catalyst is quickly washed with water. A pH of about 2 is imparted to this wash medium by chlorine entrained in the catalyst and the wash serves to remove nickel chloride.

The catalyst, substantially reduced in iron, nickel and vanadium content, is filtered from the wash slurry, dried at about 350° F. and returned to the regenerator. The treated catalyst is analyzed and shows a metals content of 151 p.p.m. nickel, 1420 p.p.m. vanadium and 600 p.p.m. iron.

The vapor products from the cracking are conducted to a fractionator where the lower boiling constituents from the effluent, boiling below about 430° F., are vaporized and removed from the system for use as a gasoline blending component. The residue from the fractionator is sent to a second cracking stage for further gasoline production.

*Example II*

A "Nalcat" synthetic gel silica-alumina finely divided fluid-type cracking catalyst composed of about 25% $Al_2O_3$, substantially the rest $SiO_2$, was used in a commercial catalytic cracking conversion unit, using conventional fluidized catalyst techniques, including cracking and air regeneration to convert a feedstock comprising a blend of Wyoming and Mid-Continent gas oils containing about 0.2 p.p.m. nickel and 1.2 p.p.m. vanadium and about 2 weight percent sulfur. This gas oil blend had a gravity (API) of 24°, a carbon residue of about 0.3 weight percent and a boiling range of about 500 to 1000° F. A 5% side-stream of this catalyst, having a content of about 500 p.p.m. $V_2O_5$ and about 50 p.p.m. NiO, is removed from the cracking system after regeneration, subjected to magnetic flux for tramp iron removal, and is admitted to the outer annular chamber of the oxygen-treater-sulfider. The catalyst is air-treated in the outer annular chamber at a temperature of about 1150° F. After an average residence time of about 2 hours the catalyst passes into the inner chamber where it is sulfided with $H_2S$ at about 1150° F. for about an hour average residence time. The sulfiding effluent is burned with the oxygen-treater effluent. The sulfided catalyst is then oxidized with an $HNO_3$ aqueous solution through which air is bubbled. The filter cake from the $HNO_3$ treatment is washed with water on the filter and then the filter cake is slurried 10 minutes at 180° F. in dilute $NH_4OH$ solution, washed again, dried and returned to the hydrocarbon conversion system. The demetallization treatment removes about 22.6% of the iron, 60.5% of the nickel and about 27.3% of the vanadium poisons.

It is claimed:

1. In a process for catalytically cracking a petroleum stock which contains metallic impurities selected from the group consisting of vanadium, nickel and iron in an amount sufficient to cause deterioration in selectivity of a silica-based cracking catalyst, said cracking including a catalytic cracking zone and a catalyst regeneration zone between which the catalyst is cycled and in which cracking zone the catalyst becomes contaminated with the said metallic impurity of said hydrocarbon feedstock and in which regeneration zone carbon is oxidized at an elevated temperature and thereby removed from the catalyst, wherein a portion of the regenerated catalyst contaminated with said metallic impurity is bled from the cracking system and demetallized by contact with a molecular oxygen-containing gas at an elevated temperature with the production of a molecular oxygen-containing effluent vapor, contact of the so-treated catalyst with a sulfiding vapor at an elevated temperature to produce a free sulfur-containing effluent vapor and removal of said metallic impurity from the catalyst, and wherein catalyst is returned to said catalytic cracking system, the improvement which comprises burning the effluent vapor from sulfiding with the effluent vapor from oxygen treatment to eliminate plugging of downstream lines with solid sulfur.

2. In a process for catalytically cracking to gasoline a petroleum stock boiling above the gasoline range and containing nickel and vanadium impurities in an amount sufficient to cause deterioration is selectivity of a silica-based cracking catalyst, said cracking including a catalytic cracking zone and a catalyst regeneration zone between which the catalyst is cycled and in which cracking zone the catalyst becomes contaminated with the said metallic impurities of said hydrocarbon feedstock and in which regeneration zone carbon is oxidized at an elevated temperature and thereby removed from the catalyst, wherein a portion of the regenerated catalyst contaminated with said metallic impurities is bled from the cracking system and demetallized by contacting the catalyst with a molecular oxygen-containing gas at a temperature of about 1000 to 1800° F., but below a temperature at which the catalyst undergoes any substantial deleterious change in its physical or chemical characteristics to enhance vanadium removal while producing a molecular oxygen-containing effluent vapor, sulfiding the catalyst with $H_2S$ at a temperature of about 500 to 1500° F. to enhance nickel removal while producing a free sulfur-containing effluent vapor and removal of nickel and vanadium from the treated catalyst, and return of demetallized catalyst to the cracking system, the improvement which comprises burning the effluent vapor from sulfiding with effluent vapor from the oxygen treatment to eliminate plugging of the downstream lines with solid sulfur.

3. In a process for catalytically cracking to gasoline a petroleum stock boiling above the gasoline range and containing up to 30 p.p.m. nickel and vanadium impurities, said cracking including a catalytic cracking zone and a catalyst regeneration zone between which the catalyst is cycled and in which cracking zone carbon is oxidized by contact with air at a temperature of about 950 to 1200° F. and thereby removed from the catalyst, wherein a portion of the regenerated catalyst containing at least about 250 p.p.m. vanadium and at least about 100 p.p.m. nickel is bled from the cracking system and demetallized by contacting the catalyst with air at a temperature of about 1150 to 1350° F., but below a temperature at which the catalyst undergoes any substantial deleterious change in its physical or chemical characteristics to enhance vanadium removal while producing a molecular oxygen-containing effluent vapor, sulfiding the catalyst with $H_2S$ at a temperature of about 800 to 1300° F. to enhance nickel removal while producing a free sulfur-containing effluent vapor and removal of about 10 to 75% of the total nickel and vanadium from the catalyst by a treatment including an aqueous medium wash, and return of demetallized catalyst to the cracking system, the improvement which comprises burning the effluent vapor from sulfiding with effluent vapor from the oxygen treatment to eliminate plugging of the downstream lines with solid sulfur.

4. The process of claim 2 in which oxygen treatment is performed in a zone annular to the sulfiding treatment zone under conditions of indirect heat exchange.

5. The process of claim 4 in which oxygen treatment and sulfiding are performed at about the same temperature.

6. The method of claim 2 in which the oxygen-containing gas is air.

7. The method of claim 6 in which air treatment is conducted at a temperature of about 1150 to 1350° F. and sulfiding is conducted at a temperature of about 800 to 1300° F.

References Cited in the file of this patent

UNITED STATES PATENTS

| | | |
|---|---|---|
| 2,273,299 | Szayna | Feb. 17, 1942 |
| 2,494,556 | Hornaday | Jan. 17, 1950 |

FOREIGN PATENTS

| | | |
|---|---|---|
| 596,177 | Canada | Apr. 12, 1960 |

OTHER REFERENCES

Partington: "A Textbook of Inorganic Chemistry," Sixth Edition, McMillan and Co., Ltd., London, page 463.

UNITED STATES PATENT OFFICE
CERTIFICATE OF CORRECTION

Patent No. 3,178,364                                      April 13, 1965

Howard G. Russell

It is hereby certified that error appears in the above numbered patent requiring correction and that the said Letters Patent should read as corrected below.

Column 8, line 67, for "75%" read -- 70% --.

Signed and sealed this 1st day of February 1966.

(SEAL)
Attest:

ERNEST W. SWIDER                                     EDWARD J. BRENNER
Attesting Officer                                        Commissioner of Patents